Dec. 4, 1934.                    A. A. HILL                    1,983,458
                                  CHURN
                            Filed Nov. 7, 1933
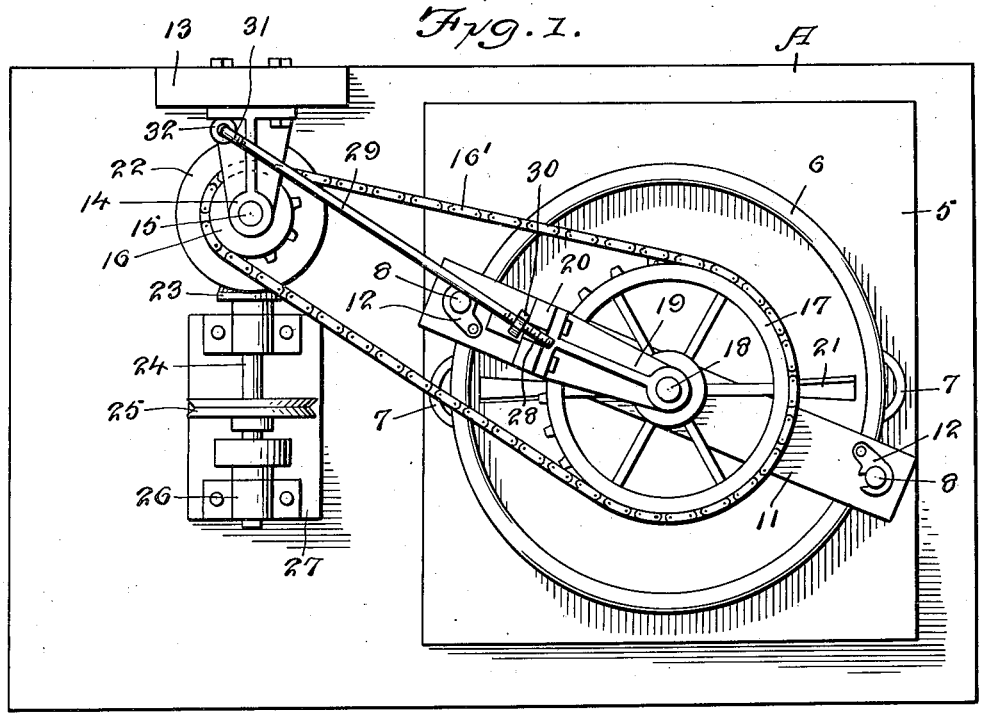
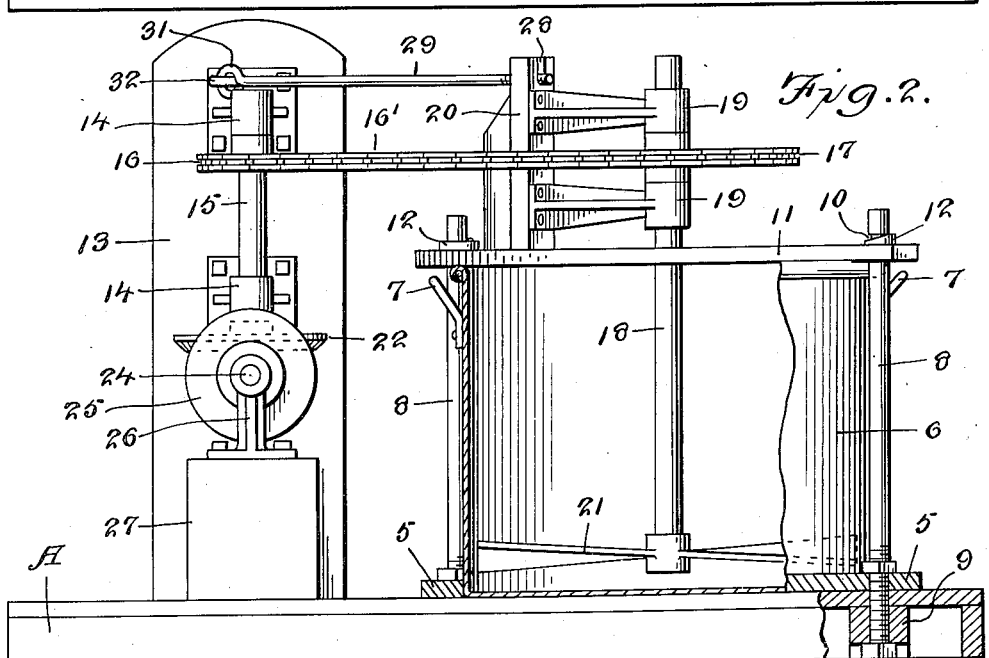
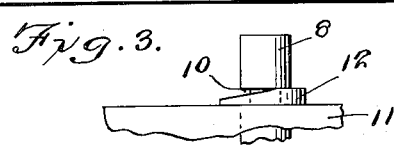
Abram A. Hill  INVENTOR
BY *Victor J. Evans & Co.*  ATTORNEY Patented Dec. 4, 1934

1,983,458

UNITED STATES PATENT OFFICE 1,983,458

CHURN

Abram A. Hill, Prattsville, N. Y.

Application November 7, 1933, Serial No. 697,062

1 Claim. (Cl. 259—108)

The invention relates to a churn and more especially to a maple butter making machine.

The primary object of the invention is the provision of a machine of this character, wherein maple syrup and other constituents can be placed within a container so that the mass can be mixed for the making of maple butter with dispatch, as the substances or constituents of the mass can be better worked or stirred, whereby the butter will have smoothness and be of a proper mix.

A further object of the invention is the provision of a machine of this character, wherein the necessity for hand stirring is entirely eliminated as the machine can be operated from applied mechanical power, and in the construction free access may be had to the container for the mixture, the machine being novel in construction.

A further object of the invention is the provision of a machine of this character which is simple in construction, thoroughly reliable and efficient in its purposes, economical in its make-up, convenient for operation, strong, durable, and inexpensive to manufacture.

With these and other objects in view, the invention consists in the features of construction, combination and arrangement of parts as will be hereinafter more fully described in detail, illustrated in the accompanying drawing, which discloses the preferred embodiment of the invention, and pointed out in the claim hereunto appended.

In the accompanying drawing:

Figure 1 is a top plan view of the machine constructed in accordance with the invention.

Figure 2 is a side elevation partly in section.

Figure 3 is a detail elevation of the manner of fastening the top or cover to the container.

Similar reference characters indicate corresponding parts throughout the several views in the drawing.

Referring to the drawing in detail, A designates a suitable base having arranged thereon a frame 5 constituting a seat for accommodating a container 6 in which the mixture is placed for the stirring thereof. This container carries, at opposite sides, handles 7 convenient for transportation thereof. Suitably anchored in the base A and the frame 5 are opposed uprights 8, each being in the form of a rod and disposed exteriorly of the container 6, the rods being anchored by the fasteners 9. The upper ends of the rods 8 protrude a distance above the container 6 and these ends are provided with reduced portions 10 constituting shoulders, while fitted upon these rods 8 is a cross bridge piece 11, the same being provided with suitable holes for the reception of the rods 8 and being adapted to rest upon the mouth rim of the container 6.

Pivotally mounted on the piece 11 are hook-like cam-acting catches 12 which engage with reduced portions 10 of the rods 8 for the firm clamping of the piece 11 down upon the container 6, the cam action of the catches being had with the shoulders provided by the reduced portions 10 in the rods 8.

Located adjacent to the frame 5 is an upright 13 rising from the base A and having fitted thereto bearings 14 for a vertically driven shaft 15. This shaft carries a sprocket wheel 16 for an endless sprocket chain 16', the same being trained over a sprocket wheel 17 fixed to a stirrer stem or shaft 18, the latter being journaled in suitable bearings 19 fixed to a support 20 rising from the piece 11. The stem or shaft 18, at its lower end, carries a stirring blade 21, the stem or shaft being loosely engaged centrally in the piece 11, as shown in Figures 1 and 2 of the drawing.

The shaft 15 also carries a beveled gear 22 meshing with a pinion 23 on a pulley shaft 24, the latter being adapted for having the pulley 25, the latter being adapted for transmitting power to the machine from any outside mechanical source. The shaft 24 is supported in bearings 26 upon a stand 27 on the base A.

The support 20 is formed with a forked end 28 for receiving a rod 29 having an adjustable abutment nut 30 designed to play against the support and this rod 29 at its eye end 31 is swingingly connected with an eye fastener 32 engaged through the uppermost bearing 14 with the upright 13, the purpose of the rod being to brace the support 20 when the piece 11 is clamped down upon the container 6.

It is understood, of course, that the mix for the making of maple butter is introduced into the container 6 and on the driving of the stirrer 21 this mix will be worked for the churning thereof for the production of maple butter.

What is claimed is:

In a machine of the character described, a pair of standards, driven gears journaled with the standards, a fork at the upper end of one standard, a swinging brace on the other standard and received in the fork, a nut adjustable on the brace and forming an abutment for the fork, an endless chain trained over the gears for the transfer of power therebetween, supports for the standards, one being stationary and the other movable, and a dasher operated by one of the gears and carried by the movable support.

ABRAM A. HILL.